Figures 1, 2:
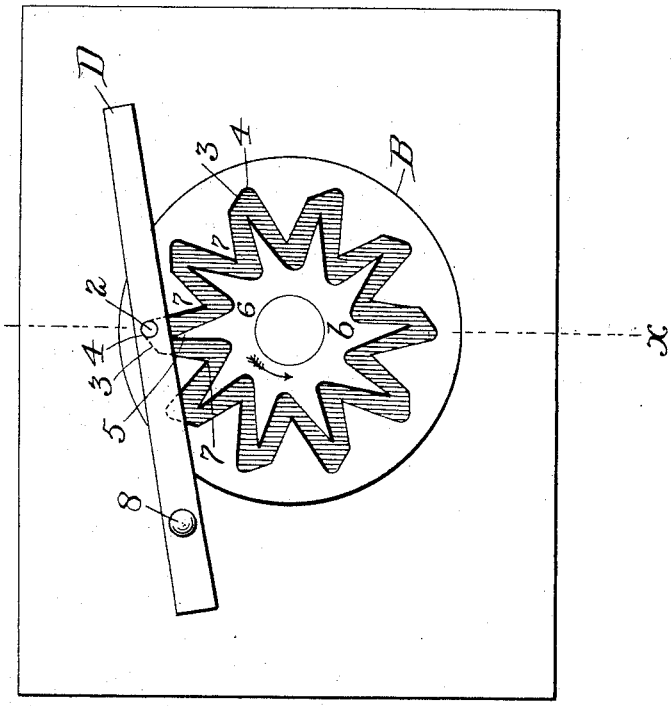

No. 630,830. Patented Aug. 8, 1899.
S. C. HOUGHTON.
MECHANICAL MOVEMENT.
(Application filed Apr. 28, 1898.)
(No Model.)

Attest,
F. L. Middleton
C. S. Middleton

Inventor
Stephen C. Houghton
by Ellis Spear
Atty

THE NORRIS PETERS CO., PHOTO-LITHO., WASHINGTON, D. C.

UNITED STATES PATENT OFFICE.

STEPHEN C. HOUGHTON, OF SAN FRANCISCO, CALIFORNIA.

MECHANICAL MOVEMENT.

SPECIFICATION forming part of Letters Patent No. 630,830, dated August 8, 1899.

Application filed April 28, 1898. Serial No. 679,113. (No model.)

*To all whom it may concern:*

Be it known that I, STEPHEN C. HOUGHTON, a citizen of the United States, residing at San Francisco, county of San Francisco, and State of California, have invented certain new and useful Improvements in Mechanical Movements, of which the following is a specification.

My invention is an improved mechanical movement designed to produce a uniform step-by-step motion and to lock the part moved at each step.

My object is to provide a simple inexpensive device certain in its operation and not likely to get out of order.

I have shown the invention applied to a wheel, as illustrated in the accompanying drawings.

In the drawings, Figure 1 shows a face view, and Fig. 2 a central transverse section.

The principal part of this mechanism as thus illustrated, which I have called the "toothed" or "moving" part, is shown at B. Its central portion (marked $b$) has teeth whose sides slope to a point and which project outward. The outer or rim portion has similar teeth projecting inward, the teeth of one set entering the spaces between the other set, the teeth in fact being formed by a continuous zigzag groove the bottom of which is the back of the wheel. The wheel is mounted upon a central pivot and may have any desired connections. Into this groove projects a stud 2, which is mounted independently of the principal part and reciprocates in a fixed way across the general line of the zigzag groove, its path in either direction lying across the line of the rear face of the teeth and at an angle thereto as the teeth move in succession to the path of the stud, whereby in the movement of the stud in either direction it forces the principal or moving part forward, and when arrested at either extremity of its movement it locks that part in place. It is essential that there shall be such relation between the form of the teeth and the direction of the path of the stud, that the stud, on leaving its position of rest on either side, shall strike in rear of the point of the tooth and shall move, as aforesaid, across the line of the rear face of the tooth. At the same time it is necessary for the greatest moving effect that the line of movement of the stud shall be as nearly radial as possible. If the teeth be made symmetrical, said line of movement of the stud must be inclined to the rear of the tooth (supposing the wheel to be moving in the direction of the arrow) and not directly to the center; but if the teeth be inclined forward, as shown, or the rear face so formed as to throw the stud back the stud moving radially will strike the rear face of the tooth in every movement. The bottom of the spaces between the teeth is formed exactly to receive the stud, and this at the end of every movement, whether in or out, locks the toothed or moving part in place. The stud, therefore, is at the same time the motor and a lock.

In the particular form shown the inclined tooth impinged upon by the stud is turned more from the radial line, as at 3, and this throws the tooth forward, and the stud relatively more to the rear, to the locking-point 4 of the peripheral portion. In this position the stud is in its extreme outward and locking position. The point 5 of the inner series is in advance of the radial line $x\ x$, which is substantially the fixed path of the stud. The stud therefore strikes behind the point 5 and moves over the rear face 5 6 of the tooth to the inner locking-point 6, also exactly fitted to receive it. This side 5 6 is longer than the opposite side of the tooth, and consequently the point 7 of the outer series of teeth is forward of the line $x\ x$ when the stud is at 6, and on its return outward said stud will pass in rear of the point 7 of the outer series of teeth and impinge upon and force forward that tooth. The construction of all the teeth being the same, the same effect occurs with all. It will be seen, therefore, that the particular form of the teeth is not essential nor is it essential that the line $x\ x$ be exactly radial, but only that the tooth-point at the instant of rest be in advance of the said line.

I have shown the stud for convenience of illustration as carried upon a lever D, which is pivoted at 8. The path of the stud is in this case slightly curved; but this is not essential. Also I have shown the part moved in circular form; but while this is of special importance the invention may be applied in rectilinear lines. It is also obvious that the operation may be reversed, the wheel or toothed portion becoming the motor by force applied thereto and the stud and the part to which it is attached being then the part moved.

I claim—

A disk having in or upon its face a series of inner and a series of outer teeth, so arranged as to form a permanent zigzag groove between said inner and outer teeth, and a stud or pin with carrier means to cause it to move backward and forward over a constant path, such teeth being so placed that when the stud is at rest at either end of its path a radial line drawn from the center of the disk to its periphery and passing centrally through the stud will intersect the opposite tooth at one side of its point, so that the stud moving from its position of rest will strike that point of intersection and cause the disk to move always in one direction.

In testimony whereof I affix my signature in presence of two witnesses.

STEPHEN C. HOUGHTON.

Witnesses:
 HENRY E. COOPER,
 HARRY L. MOCKBEE.